United States Patent [19]
Lee et al.

[11] Patent Number: 5,985,781
[45] Date of Patent: Nov. 16, 1999

[54] DIELECTRIC CERAMIC COMPOSITIONS

[75] Inventors: Hyo-Jong Lee; Kug-Sun Hong; Byung-Kyu Kim, all of Seoul, Rep. of Korea

[73] Assignee: Amecs Co., Ltd., Kyungki-do, Rep. of Korea

[21] Appl. No.: 09/056,613

[22] Filed: Apr. 8, 1998

[30] Foreign Application Priority Data

Apr. 9, 1997 [KR] Rep. of Korea ............... 97-12938

[51] Int. Cl.$^6$ ............................................. C04B 35/495
[52] U.S. Cl. ........................................................ 501/135
[58] Field of Search ............................................. 501/135

[56] References Cited

U.S. PATENT DOCUMENTS 5,756,412  5/1998  Lee et al. ................................ 501/135

OTHER PUBLICATIONS

Chem. Abstracts 129:309681, Lee et al, abstract of KR 97–12938, Apr. 1997.
Chem. Abstracts 79:97877, Perrotta et al, J. Amer. Ceram. Soc (1973), 56(8), 441, 1973.
Chem. Abstracts, 109:203627 Halle et al, Z. Anorg. Allg. Chem. (1988), 562,87–90, 1988.

*Primary Examiner*—Karl Group
*Attorney, Agent, or Firm*—McDermott, Will & Emery

[57] ABSTRACT

Provided with a dielectric ceramic composition for microwaves having the formula represented by $yMgTa_{2-x}O_{6-5/2x}+(1-y)ZnNb_2O_6+wC$, wherein $0<x\leq0.8$, $0.1\leq y\leq1$, $0\leq w\leq2$ wt %, and C is at least one selected from a group consisting of $Sb_2O_5$, $CuO$, $ZnO$, $NiO$, $MgO$, $SrCO_3$, $BaCO_3$, $ZrO_2$, $WO_3$, and $TiO_2$, the composition having a low permittivity of 20–30, a quality factor almost equal to that of $Ba(Zn,Ta)O_3$ families, and a relatively excellent sintering characteristic, thus particularly suitable for dielectric resonators in a high frequency band above 10 GHz.

5 Claims, No Drawings

DIELECTRIC CERAMIC COMPOSITIONS

BACKGROUND OF THE INVENTION

1. Field of the Invention

The present invention relates to dielectric ceramic compositions for microwave application and, more particularly, to dielectric ceramic compositions for microwave devices such as, for example, those having a dielectric resonator designed to operate in a microwave frequency range of 10 GHz above.

2. Discussion of Related Art

Recently, telecommunications such as mobile communication and satellite communication have focused a growing interest in dielectric ceramic devices for microwave application. In particular, mobile communication arrangements which include automobile telephones, cellular phones, pagers and GPS (Global Positioning Systems) employ microwave dielectric materials which are required to possess various electrical and physical properties such as, for example, high permittivity ($\in$), high quality factor(Q), small temperature coefficient of resonance frequency ($\tau_f$), and good sintering characteristics.

To meet these requirements, U.S. Pat. No. 5,756,412 by the present inventor discloses a novel dielectric ceramic composition having the formula expressed by $B'B''_2O_6$ (wherein B' is at least one metal selected from the group consisting of Mg, Ca, Co, Mn, Ni and Zn, and B'' is one metal selected from the group consisting of Nb and Ta).

Many studies are now being made on the dielectric ceramic compositions that have dielectric properties of high reliability and can be used in a high frequency band above 10 GHz for satellite broadcasting and communication systems. A dielectric ceramic composition used in a high frequency band must have required dielectric properties, e.g., comparably low permittivity of around 20–30, small temperature coefficient of resonance frequency and especially high quality factor, as well as an excellent sintering characteristics.

Based on these requirements, the present inventor studied on the dielectric ceramic compositions having the formula expressed by $B'B''_2O_6$ (wherein B' is Mg and B'' is one metal selected from the group consisting of Nb and Ta) and revealed that such dielectric ceramic compositions have dielectric properties of high reliability in a high frequency band of above 10 GHz.

SUMMARY OF THE INVENTION

Accordingly, the present invention is directed to dielectric ceramic compositions that substantially obviate one or more of the problems due to limitations and disadvantages of the related art.

An object of the present invention is to provide dielectric ceramic compositions capable of being used in a high frequency band of above 10 GHz and particularly having the good quality factor.

To achieve these and other advantages and in accordance with the purpose of the present invention, as embodied and broadly described, a dielectric ceramic composition for microwave has the formula represented by $y MgTa_{2-x}O_{6-5/2x}+(1-y)ZnNb_2O_6+wC$, wherein $0<x\leq 0.8$, $0.1\leq y\leq 1$, $0\leq w\leq 2$ wt %, and C is at least one selected from the group of $Sb_2O_5$, CuO, ZnO, NiO, MgO, $SrCO_3$, $BaCO_3$, $ZrO_2$, $WO_3$, and $TiO_2$.

Further, the additive element, C may comprise $SnO_2$, which is in the range of 3~20 wt % of the total of the dielectric ceramic composition.

The reason that non-stoichiometric magnesium tantalate compound is used as a basic component in the present invention consists in the facts as described below. The present inventor's study revealed that out of $B'B''_2O_6$ family dielectric ceramic compositions, magnesium tantalate and $ZnNb_2O_6$ compounds have outstanding dielectric properties and that magnesium tantalate has low dielectric constant of 20~30 and higher quality factor relative to those of $ZnNb_2O_6$. From the phase diagram of MgO—$Ta_2O_5$, the producible compounds are $MgTa_2O_6$ and $Mg_4Ta_2O_9$. Out of these compounds, $Mg_4Ta_2O_9$ is excellent in dielectric properties but problematic with respect to its sintering characteristic. However, the present invention provides a dielectric ceramic composition having an improved sintering characteristic as well as desired dielectric properties by forming a mixture of $MgTa_2O_6$ and $Mg_4Ta_2O_9$.

On the other hand, $ZnNb_2O_6$ having excellent dielectric properties is added in order to regulate the temperature coefficient of resonance frequency. At least one compound selected from the group of $Sb_2O_5$, CuO, ZnO, NiO, MgO, $SrCO_3$, $BaCO_3$, $SnO_2$, $ZrO_2$, $WO_3$ and $TiO_2$ is usually added to the dielectric ceramic composition, with a view to enhancing the dielectric properties or decreasing the sintering temperature.

x above 0.8 leads to an increase of the sintering temperature with an excessively low permittivity. If y is less than 0.1, the mole fraction of magnesium tantalate becomes too small to expect an increase of the quality factor. The amount of $SnO_2$ less than 3 wt % is substantially ineffective in regulating the temperature coefficient of resonance frequency, and $SnO_2$ in excess of 20 wt % increases the temperature coefficient of resonance frequency in the negative (–) direction. w exceeding 2.0 wt % leads to a decrease in the quality factor.

Reference will now be made in detail to the preferred embodiments of the present invention.

DETAILED DESCRIPTION OF PREFERRED EMBODIMENTS

Embodiment 1

MgO and $Ta_2O_5$ powder of high purity is weighed in a quantitative manner and a mixture of the powder and distilled water is formed at the ratio of 1:1 by use of a zirconia ball. The mixture is rapidly dried by spraying it onto a hot plate less that it be separated into multiple layers due to the difference in specific gravity. Dried powder is calcined in an alumina crucible at a temperature between 900 and 1050° C. for 2 hours, producing $MgTa_{2-x}O_{6-5/2x}$. The $MgTa_{2-x}O_{6-5/2x}$ powder is again ball-milled for 24 hours. The pulverized powder is dried in an oven at 100° C. enough to have an adequate moisture content and then subjected to a press molding with the pressure of 1000 kg/cm² into a disc of 12 mm in diameter and about 6 mm thick. The disc sample is sintered at a temperature between 1300 and 1450° C. for 2 hours. The rate of arising temperature is 5° C./min in the calcination or sintering step. The sample is finally subjected to a furnace cooling.

The sintered sample is measured for the quality factor Q*f, the temperature coefficient of resonance frequency $\tau_f$ and the permittivity $\in$ with a network analyzer HP 8753D at 10 GHz by way of the Hakki-Coleman post resonator method. The sample with high Q factor of certain specimens were analyzed by the cavity method.

Embodiment 2

$ZnNb_2O_6$ is synthesized in the same manner as the embodiment 1 with an exception that highly pure ZnO and $Nb_2O_5$ powder is used as raw materials. $MgTa_{2-x}O_{6-5/2x}$ prepared in the embodiment 1 and $ZnNb_2O_6$ are blended at a quantitative ratio into mixed powder, which is ball-milled for 24 hours and calcined at a temperature between 900 and 1050° C. for 2 hours or more. The calcined powder is ball-milled for 24 hours again, rapidly dried, and subjected to a press molding with the pressure of 1000 kg/cm$^2$ into a disc of 12 mm in diameter and about 6 mm thick. The disc sample is sintered at a temperature between 1300 and 1450° C. for more than 2 hours.

The sintered sample is measured for the quality factor Q*f, the temperature coefficient resonant frequency $\tau_f$ and the permittivity $\in$ with a network analyzer HP 8753D at 10 GHz by way of the Hakki-Coleman post resonator method. The sample with high Q value is analyzed by the cavity method.

Embodiment 3

A sintered sample is prepared in the same manner as the embodiment 2 with an exception that at least one compound selected from the group of $Sb_2O_5$, CuO, ZnO, NiO, MgO, $SrCO_3$, $BaCO_3$, $ZrO_2$, $WO_3$ and $TiO_2$ is added as an additive to the mixed powder obtained in the embodiment 2.

The sintered sample is measured for the quality coefficient Q*f, the resonant frequency temperature coefficient $\tau_f$ and the permittivity $\in$ with a network analyzer HP 8753 at 10 GHz by way of the Hakki-Coleman post resonator method. The sample with high Q value is analyzed by the cavity method.

The results are shown in Table 1.
Table 1:
Dielectric Properties of Dielectric Ceramic Compositions of the Present Invention.

As shown in Table 1, $MgTa_{2-x}O_{6-5/2x}$(y=1, w=0) as a base composition the permittivity $\in$ of which is in the range of 22.6~28.7 with the value of the Q factor (Q*f) of 65,000~208,000. This fact means that $MgTa_{2-x}O_{6-5/2x}$ system has excellent dielectric properties and is comparative to the Ba(Zn,Ta)$O_3$ system($\in$=30, Q*f>120,000) or Ba(Mg,Ta)$O_3$ system($\in$=25, Q*f>200,000) which are widely known as dielectric ceramic compositions having very good dielectric properties at present. However, the compositions of the present invention have sintering temperature of about 1400° C., which is relatively lower temperature in comparision with the above dielectric ceramic compositions having perosvkite structures. The results also reveal that depending on the decrease of x value, the permittivity $\in$ of the compositions of the present invention is increased, but the width of changes of Q factors is not large except for the stoichiometric system, $MgTa_2O_6$. Therefore, according to the invention it is possible to control the permittivity $\in$ of the dielectric ceramic compositions without the large variation of the values of the quality factors (Q*f).

Depending on the addition of $ZnNb_2O_6$ compound to the $MgTa_{2-x}O_{6-5/2x}$ it tends that the temperature coefficient of resonance frequency $\tau_f$ of the composition gradually converges into 0 (See Sample Nos. 11 and 17) and the permittivity $\in$ slightly decreases. Additionally, as can be seen from the sample Nos. 4 and 17 in Table 1, the sintering temperature of the $ZnNb_2O_6$-added composition is lowered to 1340° C.

By adding oxides such as $Sb_2O_5$, $WO_3$ and $TiO_2$ to the dielectric compositions, the permittivity was increased. Further, by adding ZnO oxide Q factor was increased. Additionally, it is noted that temperature coefficient of

| | A* | x | C | y | w (wt %) | $\epsilon$ | $\tau_f$ | Q*f | B* (° C.) |
|---|---|---|---|---|---|---|---|---|---|
| EMBODIMENT 1 | 1 | 0 | — | 1 | 0 | 28.7 | 30.2 | 65,000 | 1450 |
| | 2 | 0.05 | — | 1 | 0 | 28.2 | 36.1 | 116,000 | 1450 |
| | 3 | 0.1 | — | 1 | 0 | 27.8 | 43.7 | 137,000 | 1425 |
| | 4 | 0.14 | — | 1 | 0 | 26.8 | 56.2 | 206,000 | 1400 |
| | 5 | 0.2 | — | 1 | 0 | 25.8 | 52.8 | 184,000 | 1400 |
| | 6 | 0.4 | — | 1 | 0 | 24.5 | 31.3 | 192,000 | 1400 |
| | 7 | 0.6 | — | 1 | 0 | 22.6 | 27.2 | 208,000 | 1500 |
| EMBODIMENT 2 | 8 | 0 | — | 0.95 | 0 | 28.9 | 53.2 | 107,000 | 1420 |
| | 9 | 0 | — | 0.93 | 0 | 28.1 | 44.1 | 120,000 | 1420 |
| | 10 | 0 | — | 0.90 | 0 | 27.8 | 31.6 | 124,000 | 1400 |
| | 11 | 0 | — | 0.89 | 0 | 26.0 | 1.1 | 120,000 | 1400 |
| | 12 | 0 | — | 0.86 | 0 | 21.0 | −19.6 | 98,000 | 1360 |
| | 13 | 0.14 | — | 0.95 | 0 | 28.5 | 36.1 | 137,000 | 1350 |
| | 14 | 0.14 | — | 0.94 | 0 | 27.9 | 38.2 | 140,000 | 1340 |
| | 15 | 0.14 | — | 0.93 | 0 | 25.4 | 22.6 | 143,000 | 1340 |
| | 16 | 0.14 | — | 0.92 | 0 | 24.5 | 15.9 | 136,000 | 1340 |
| | 17 | 0.14 | — | 0.91 | 0 | 23.9 | 4.0 | 132,000 | 1340 |
| | 18 | 0.14 | — | 0.90 | 0 | 18.8 | −30.0 | 133,000 | 1340 |
| | 19 | 0.14 | — | 0.2 | 0 | 18.8 | −60.2 | 119,400 | 1300 |
| | 20 | 0.2 | — | 0.95 | 0 | 28.2 | 56.1 | 107,000 | 1340 |
| | 21 | 0.4 | — | 0.95 | 0 | 25.6 | 48.3 | 132,000 | 1340 |
| EMBODIMENT 3 | 22 | 0.14 | CoO | 0.90 | 0.5 | 21.4 | −1.7 | 110,000 | 1320 |
| | 23 | 0.14 | $Sb_2O_5$ | 0.90 | 0.1 | 21.6 | −3.4 | 113,500 | 1330 |
| | 24 | 0.14 | $WO_3$ | 0.90 | 0.7 | 22.9 | 6.1 | 100,500 | 1380 |
| | 25 | 0.14 | $WO_3$ + $TiO_2$ | 0.90 | 0.5 | 23.6 | 8.9 | 96,800 | 1350 |
| | 26 | 0.14 | $WO_3$ + $SB_2O_5$ | 0.90 | 0.5 | 22.5 | 6.7 | 92,300 | 1340 |
| | 27 | 0.14 | $TiO_2$ | 0.91 | 1.0 | 27.1 | 8.3 | 113,000 | 1340 |
| | 28 | 0.14 | MgO | 0.95 | 0.5 | 27.1 | 42.1 | 126,000 | 1350 |
| | 29 | 0.14 | NiO | 0.95 | 0.2 | 27.5 | 45.7 | 118,000 | 1350 |
| | 30 | 0.14 | $SrCO_3$ | 0.95 | 1.5 | 27.1 | 44.9 | 105,000 | 1350 |
| | 31 | 0.14 | ZnO | 0.95 | 1.0 | 28.1 | 43.8 | 139,000 | 1320 |
| | 32 | 0.14 | $BaCO_3$ | 0.95 | 1.0 | 27.3 | 44.9 | 112,000 | 1340 |

A*: SAMPLE No.
B*: SINTERING TEMPERATURE (° C.)

resonace frequency was regulated in preferable ranges by adding additive oxides.

Embodiment 4

$MgTa_{2-x}O_{6-5/2x}$ prepared in the embodiment 1 and $SnO_2$ are blended at a quantitative ratio into mixed powder, which is ball-milled for 24 hours. The pulverized powder is dried in in an oven at 100° C. enough to have an adequate moisture conent and then subjected to a press molding with the pressure of 1000 kg/cm² into a disc of 12 mm in diameter and about 10 mm thick. The disc sample is sintered at a temperature between 1300 and 1450° C. for 2 hours. The rate of arising temperature is 5° C./min in the calcination or sintering step. The sample is finally subjected to a furnace cooling.

The sintered sample is measured for the quality factor $Q*f$, the temperature coefficient of resonance frequency $\tau_f$ and the permittivity $\in$ with a network analyzer HP 8753D at 10 GHz by way of the Hakki-Coleman post resonator method. The sample with high Q factor of certain specimens were analyzed by the cavity method.

Embodiment 5

A sintered sample is prepared in the same manner as the Embodiment 4 with an exception that at least one compound selected from the group of $Sb_2O_5$, $ZrO_2$, $WO_3$ and $TiO_2$ is added as an additive to the mixed powder obtained in the Embodiment 4.

The sintered sample is measured for the quality factor $Q*f$, temperature coefficient of resonant frequency $\tau_f$ and the permittivity $\in$ with a network analyzer HP 8753D at 10 GHz by way of the Hakki-Coleman post resonator method. The sample with high Q value is analyzed by the cavity method.

Embodiment 6

$ZnNb_2O_6$ is synthesized in the same manner as the embodiment 4 with an exception that highly pure ZnO and $Nb_2O_5$ powder is used as raw materials. $MgTa_{2-x}O_{6-5/2x}$ prepared in the embodiment 4 and $ZnNb_2O_6$ are blended at a quantitative ratio into mixed powder, which is ball-milled for 24 hours and calcined at a temperature between 900 and 1050° C. for 2 hours or more. The calcined powder is ball-milled for 24 hours again, rapidly dried, and subjected to a press molding with the pressure of 1000 kg/cm² into a disc of 12 mm in diameter and about 10 mm thick. The disc sample is sintered at a temperature between 1300 and 1450° C. for more than 2 hours.

The sintered sample is measured for the quality factor $Q*f$, temperature coefficient of resonant frequency $\tau_f$ and the permittivity $\in$ with a network analyzer HP 8753D at 10 GHz by way of the Hakki-Coleman post resonator method. The sample with high Q value is analyzed by the cavity method.

The results are shown in Table 2.

Table 2:

Dielectric Properties of Dielectric Ceramic Compositions of the Present Invention.

| | A* | x | C | y | w (wt %) | $\in$ | $\tau_f$ | Q*f | B* (° C.) |
|---|---|---|---|---|---|---|---|---|---|
| EMBODIMENT 4 | 1 | 0.4 | $SnO_2$ | 1 | 5 | 23.4 | −3.2 | 137,000 | 1400 |
| | 2 | 0 | $SnO_2$ | 1 | 4 | 26.1 | 4.3 | 87,000 | 1450 |
| | 3 | 0.2 | $SnO_2$ | 1 | 6 | 23.8 | 5.3 | 124,000 | 1420 |
| | 4 | 0.14 | $SnO_2$ | 1 | 1 | 27.2 | 60.4 | 109,900 | 1360 |
| | 5 | 0.14 | $SnO_2$ | 1 | 5 | 24.8 | 3.83 | 126,400 | 1360 |
| | 6 | 0.14 | $SnO_2$ | 1 | 10 | 25.6 | 5.3 | 137,000 | 1400 |
| | 7 | 0.14 | $SnO_2$ | 1 | 15 | 23.2 | −13.4 | 113,500 | 1400 |
| EMBODIMENT 5 | 8 | 0.14 | $Sb_2O_5/SnO_2$ | 1 | 0.5/7 | 29.1 | 46.9 | 132,000 | 1340 |
| | 9 | 0.14 | $WO_3/SnO_2$ | 1 | 0.7/8 | 25.9 | 6.1 | 100,553 | 1380 |
| | 10 | 0.14 | $ZrO_2/SnO_2$ | 1 | 1/10 | 27.0 | 42.1 | 65,000 | 1350 |
| | 11 | 0.14 | $TiO_2/SnO_2$ | 1 | 0.2/10 | 25.1 | −3.6 | 99,000 | 1350 |
| | 12 | 0.14 | $ZrO_2 + TiO_2/SnO_2$ | 1 | 2/8 | 27.4 | 1.6 | 76,000 | 1380 |
| | 13 | 0.2 | $ZrO_2 + TiO_2/SnO_2$ | 1 | 2/7 | 25.8 | 4.92 | 70,000 | 1360 |
| | 14 | 0.14 | $ZrO_2 + TiO_2/SnO_2$ | 1 | 1.8/10 | 26.3 | 2.62 | 75,000 | 1360 |
| EMBODIMENT 6 | 15 | 0.14 | SnO2 | 0.91 | 5 | 24.8 | 9.8 | 100,400 | 1360 |
| | 16 | 0.14 | SnO2 | 0.91 | 6 | 23.9 | −4.8 | 100,480 | 1350 |

A*: SAMPLE No.
B*: SINTERING TEMPERATURE (° C.)

As shown in Table 2, Addition of $SnO_2$ in an amount of 1 wt % slightly increases the permittivity and temperature coefficient of resonant frequency, decreasing the quality factor from 200,00 to 100,000, which may be compared to a sample No. 4 in Table 1 where x=0.14, y=1, and $SnO_2$ is not added, the permittivity $\in$ is 26.8 with temperature coefficient of resonant frequency $\tau_f$ 56.2. With respect to a sample Nos. 1 and 5 where $SnO_2$ is added in an amount of 5 wt %, the permittivity is somewhat decreased to 24.8 and temperature coefficient of resonant frequency approaches zero, and the quality factor becomes larger than 120,000. As not shown in Table 2, the additional amount of $SnO_2$ above 20 wt % is not desirable because temperature coefficient of resonant frequency has an excessively large negative value.

Additionally, for the sample Nos. 8 or 9 in Table 2 where $Sb_2O_5$ or $WO_3$ is used as an additive, the permittivity is increased slightly without a large deterioration of the other dielectric properties. An addition of sole $ZrO_2$ increases the permittivity highly but deteriorates the quality factor. Hence, both $ZrO_2$ and $TiO_2$ are preferably added for the actual applications of the composition of the present invention so that the permittivity and the quality are incremented, with temperature coefficient of resonant frequency approaching zero.

Where $ZnNb_2O_6$ is added (y≠1) with a view to regulating temperature coefficient of resonant frequency, the permittivity and the quality factor have no change, particularly the quality factor maintaining above 100,000, and temperature coefficient of resonant frequency approaches zero. Besides, the sintering characteristic is very excellent, i.e., below 1360° C.

As described above, the dielectric ceramic compositions of the present invention have the almost same dielectric properties as those of commercially available $Ba(Mg,Ta)O_3$ or $Ba(Zn,Tn)O_3$ families, and can be sintered at lower temperature for a shorter time compared with general dielectric compositions having a perovskite structure. It is thus concluded that the dielectric ceramic composition according to the present invention is particularly suitable for dielectric resonators that operate in a high frequency band above 10 GHz.

It will be apparent to those skilled in the art that various modifications and variations can be made in dielectric ceramic compositions of the present invention without departing from the spirit or scope of the invention. Thus, it is intended that the present invention cover the modifications and variations of this invention provided they come within the scope of the appended claims and their equivalents.

What is claimed is:

1. A dielectric ceramic composition for microwaves, having the formula represented by $yMgTa_{2-x}O_{6-5/2x}+(1-y)ZnNb_2O_6+wC$, wherein $0<x\leq0.8$, $0.1\leq y\leq1$, $0\leq w\leq2$ wt %, and C is at least one selected from the group consisting of $Sb_2O_5$, CuO, ZnO, NiO, MgO, $SrCO_3$, $BaCO_3$, $ZrO_2$, $WO_3$, and $TiO_2$.

2. The dielectric ceramic composition as defined in claim 1, wherein in case that x is 0.14, $0.88\leq y\leq0.96$.

3. The dielectric ceramic composition as defined in claim 1, wherein $SnO_2$ compound is further added in the range of 3 to 20 wt % of the total of the composition.

4. The dielectric ceramic composition as defined in claim 3, wherein in case that y=1.

5. The dielectric ceramic composition as defined in claim 3, wherein in case that x is 0.14, $0.88\leq y\leq0.96$.

* * * * *